(12) United States Patent  (10) Patent No.: US 8,452,577 B2
Sato  (45) Date of Patent: May 28, 2013

(54) GOLF BALL TRAJECTORY SIMULATION METHOD

(75) Inventor: Katsunori Sato, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 247 days.

(21) Appl. No.: 12/973,023

(22) Filed: Dec. 20, 2010

(65) Prior Publication Data

US 2011/0257945 A1    Oct. 20, 2011

Related U.S. Application Data

(63) Continuation-in-part of application No. 12/763,425, filed on Apr. 20, 2010.

(51) Int. Cl.
*G06G 7/48* (2006.01)
*G06F 17/10* (2006.01)
*G06F 7/60* (2006.01)
*G06F 17/50* (2006.01)

(52) U.S. Cl.
USPC ........................................ 703/6; 703/1; 703/2

(58) Field of Classification Search
USPC ................. 703/1, 2, 6; 473/165, 383–384
See application file for complete search history.

(56) References Cited

U.S. PATENT DOCUMENTS

| | | | |
|---|---|---|---|
| 6,241,622 B1 * | 6/2001 | Gobush et al. | 473/199 |
| 6,533,674 B1 * | 3/2003 | Gobush | 473/199 |
| 6,616,543 B1 * | 9/2003 | Gobush et al. | 473/199 |
| 6,729,976 B2 * | 5/2004 | Bissonnette et al. | 473/383 |
| 6,913,550 B2 * | 7/2005 | Bissonnette et al. | 473/383 |
| 7,076,414 B2 | 7/2006 | Miyori | |
| 7,086,955 B2 * | 8/2006 | Gobush et al. | 473/199 |

(Continued)

FOREIGN PATENT DOCUMENTS

| JP | 2002-250739 A | 9/2002 |
|---|---|---|
| JP | 2002-340735 A | 11/2002 |

(Continued)

OTHER PUBLICATIONS

A.J.Cochran and M.R Farrally, Science and Golf II: Proceedings of the World Scientific Congress of Golf, Published in 1994 by E & FN Spon, London.*

(Continued)

*Primary Examiner* — Mary C Jacob
*Assistant Examiner* — Aniss Chad
(74) *Attorney, Agent, or Firm* — Sughrue Mion, PLLC

(57) ABSTRACT

A method for simulating a golf ball trajectory is provided. The simulation method sets up a golf ball model within a virtual airflow space where a grid has been generated, sets a weight for the ball model and applies initial conditions (initial velocity, launch angle, spin rate) to the ball model so as to cause the model to fly within the virtual airflow space, then calculates the lift coefficient and the drag coefficient for the golf ball from the air stream velocity, direction and pressure calculated in each grid cell, and calculates the flight distance and left-to-right dispersion for the golf ball from launch until landing by calculating the change in height, change in lateral direction, change in velocity and change in spin rate for the golf ball during flight. The trajectory simulation method divides the flight path into regions including a high, a medium and a low velocity region.

14 Claims, 6 Drawing Sheets
(2 of 6 Drawing Sheet(s) Filed in Color)

U.S. PATENT DOCUMENTS

| | | | |
|---|---|---|---|
| 7,130,782 B2 | 10/2006 | Miyori et al. | |
| 7,156,757 B2 * | 1/2007 | Bissonnette et al. | 473/383 |
| 7,435,089 B2 | 10/2008 | Sato et al. | |
| 7,491,137 B2 * | 2/2009 | Bissonnette et al. | 473/378 |
| 7,887,439 B2 * | 2/2011 | Aoyama et al. | 473/383 |
| 7,909,711 B2 * | 3/2011 | Sullivan et al. | 473/378 |
| 2002/0147573 A1 * | 10/2002 | Miyori | 703/9 |
| 2003/0040894 A1 * | 2/2003 | Miyori et al. | 703/6 |
| 2007/0010342 A1 * | 1/2007 | Sato et al. | 473/151 |

FOREIGN PATENT DOCUMENTS

| | | |
|---|---|---|
| JP | 2002-358473 A | 12/2002 |
| JP | 2005-034378 A | 2/2005 |
| JP | 2006-275722 A | 10/2006 |

OTHER PUBLICATIONS

S. Barber, S.B. Chin, M.J. Carre, Sports ball aerodynamics: a numerical study of the erratic motion of soccer balls, Computers & Fluids, 38 (6) (2009), pp. 1091-1100.*

Tai et al., Effects of golf ball dimple configuration on aerodynamics, trajectory and acoustics, J Flow Vis Image Proc. v14.i2.40 (2007).*

Palmer, Grant, "Physics for Game Programmers", 2005, pp. Chapter 7, 167-210.*

Bassett, Nate et al., "Golf Ball Projectile Motion", Nov. 11, 2005.*

* cited by examiner

GOLF BALL TRAJECTORY SIMULATION METHOD

CROSS-REFERENCE TO RELATED APPLICATION

This application is a continuation-in-part of copending application Ser. No. 12/763,425 filed on Apr. 20, 2010, the entire contents of which are hereby incorporated by reference.

BACKGROUND OF THE INVENTION

The present invention relates to a golf ball trajectory simulation method which estimates the trajectory of a golf ball having a plurality of dimples on the surface thereof by setting up a golf ball model on a computer and employing arithmetic operations by the computer to calculate elements of motion for the golf ball model.

It is known that when a physical body such as a golf ball flies through the air, air flow turbulence arises around the body. If the surface of the body has a complex shape or the body spins while flying, the air flow turbulence during flight becomes complex and exerts a major influence on the flight performance of the body, such as the flight distance.

Golf balls are most often provided with a large number of dimples of circular shape, as seen in a plan view. Because the combination of dimple parameters such as three-dimensional shape, arrangement and size has a major influence on the aerodynamic properties of the ball, it is necessary to understand the causal relationship between these dimple parameters and the aerodynamic properties.

Usually, to investigate the influence of changes in dimple parameters such as shape, construction and arrangement on the flight performance of a golf ball, various golf ball molds are fabricated and a variety of golf balls are test-produced. The balls are then subjected to ball hitting tests, and properties such as the initial velocity, spin rate and trajectory (flight distance, height) are measured, from which the aerodynamic properties are evaluated.

However, such experimental evaluation based on actual physical prototypes, in addition to being time-consuming and expensive, is incapable of clearly establishing the causal relationships between the shapes and arrangement of the dimples and the aerodynamic properties of the ball. For this reason, golf balls which have been newly designed based on evaluation results obtained by experimentation often fail to exhibit the intended performance. In such cases, it is necessary each time to repeat the design and production of ball prototypes and verify the aerodynamic properties. Because such a process entails further expenditures of time and cost, golf balls cannot be efficiently developed in this way.

Prior-art literature relevant to the present invention is shown below.
(1) JP-A 2002-358473
(2) JP-A 2006-275722
(3) JP-A 2005-034378
(4) JP-A 2002-340735
(5) JP-A 2002-250739

SUMMARY OF THE INVENTION

It is therefore an object of the present invention to provide a method for efficiently developing golf balls by evaluating the trajectory of a golf ball having a plurality of dimples formed on the surface thereof without relying on experimental evaluation using actual physical prototypes.

Accordingly, the invention provides the golf ball trajectory simulation methods of [1] to [14] below.

[1] A golf ball trajectory simulation method which employs arithmetic operations executed by a computer to analyze and estimate the trajectory of a golf ball having a plurality of dimples on a surface thereof when the ball is launched into flight, comprising the steps of:

(A) generating a grid within a virtual airflow space (field) where the ball is to be launched;

(B) setting up within the virtual airflow space (field) a substantially spherical golf ball model having a plurality of dimples formed on a surface thereof;

(C) dividing the grid into cells in such a way as to make the grid near the golf ball model finer than the grid within the virtual space (field) and to have the grid gradually increase in size in a direction leading away from the surface of the ball model;

(D) setting a weight for the golf ball model;

(E) applying initial conditions (initial velocity, launch angle, spin rate) to the golf ball model;

(F) initiating movement of the golf ball model under the initial conditions, regenerating in an area of movement the grid near the ball in such a way as to follow the movement of the ball model without disturbing the originally set grid size, and restoring the grid after the ball has passed therethrough to the grid within the virtual airflow space (field);

(G) calculating a lift coefficient and a drag coefficient for the golf ball in flight within the virtual airflow space (field) by integrating an air stream velocity, direction and pressure calculated in each grid cell within the virtual airflow space (field); and (H) calculating a flight distance and a left-to-right dispersion for the golf ball from launch until landing by calculating a change in height, a change in lateral direction, a change in velocity and a change in spin rate for the golf ball during flight, wherein the simulation method, when estimating the trajectory, calculates the Reynolds number (Re) around the golf ball model in flight, divides a flight path of the golf ball model into two or three regions based on the criteria that Re=250,000 to 170,000 is a high-velocity region, Re=170,000 to 100,000 is a medium-velocity region and Re=100,000 and below is a low-velocity region, and sets up a height for the grid adjacent to the golf ball model surface in the high-velocity region (grid height A), a height for the grid adjacent to the golf ball model surface in the medium-velocity region (grid height B) and a height for the grid adjacent to the golf ball model surface in the low-velocity region (grid height C) such that grid height A<grid height B<grid height C.

[2] The golf ball trajectory simulation method of [1] which sets the grid height A in the high-velocity region in a range of from 0.001 to 0.015 mm, the grid height B in the medium-velocity region in a range of from 0.005 to 0.02 mm, and the grid height C in the low-velocity region in a range of from 0.01 to 0.025 mm.

[3] The golf ball trajectory method of [1] which sets up, on a bottom side of the virtual airflow space (field), a wall representing a ground surface, thereby making the bottom side of the virtual airflow space (field) a closed side.

[4] The golf ball trajectory method of [3], wherein a ball striking height, defined as the distance from the bottom side of the virtual airflow space (field) representing the ground surface to a bottommost point of the golf ball model, is added to the initial conditions set up in step (E).

[5] The golf ball trajectory simulation method of [1], wherein the grid is shaped as an adaptive Cartesian mesh.

[6] The golf ball trajectory simulation method of [1], wherein the grid is shaped as an unstructured mesh.

[7] The golf ball trajectory simulation method of [1] which calculates, from a velocity, angle and spin rate calculated for the golf ball on landing, the distance traveled by the golf ball after landing until the ball comes to rest, and thereby calculates the distance traveled by the golf ball from launch until coming to rest.

[8] A golf ball trajectory simulation method that employs arithmetic operations executed by a computer to analyze and estimate a trajectory of a golf ball having a plurality of dimples on a surface thereof when the ball is launched into flight, comprising the steps of:

(A) generating a grid within a virtual airflow space (field) where the ball is to be launched;

(B) setting up within the virtual airflow space (field) a substantially spherical golf ball model having a plurality of dimples formed on a surface thereof;

(C) dividing the grid into cells in such a way as to make the grid near the golf ball model finer than the grid within the virtual space (field) and to have the grid gradually increase in size in a direction leading away from the surface of the ball model;

(D) setting a weight for the golf ball model;

(D-2) setting up within the virtual airflow space a state wherein an air stream of a given velocity flows into the golf ball model;

(E) applying initial conditions (initial velocity, launch angle, spin rate) to the golf ball model;

(F) initiating movement of the golf ball model under the initial conditions, regenerating in an area of movement the grid near the ball in such a way as to follow the movement of the ball model without disturbing the originally set grid size, and restoring the grid after the ball has passed therethrough to the grid within the virtual airflow space (field);

(G) calculating a lift coefficient and a drag coefficient for the golf ball in flight within the virtual airflow space (field) by integrating an air stream velocity, direction and pressure calculated in each grid cell within the virtual airflow space (field); and (H) calculating a flight distance and a left-to-right dispersion for the golf ball from launch until landing by calculating a change in height, a change in lateral direction, a change in velocity and a change in spin rate for the golf ball during flight, wherein the simulation method, when estimating the trajectory, calculates the Reynolds number (Re) around the golf ball model in flight, divides a flight path of the golf ball model into two or three regions based on the criteria that Re=250,000 to 170,000 is a high-velocity region, Re=170,000 to 100,000 is a medium-velocity region and Re=100,000 and below is a low-velocity region, and sets up a height for the grid adjacent to the golf ball model surface in the high-velocity region (grid height A), a height for the grid adjacent to the golf ball model surface in the medium-velocity region (grid height B) and a height for the grid adjacent to the golf ball model surface in the low-velocity region (grid height C) such that grid height A<grid height B<grid height C.

[9] The golf ball trajectory simulation method of [8] which sets the grid height A in the high-velocity region in a range of from 0.001 to 0.015 mm, the grid height B in the medium-velocity region in a range of from 0.005 to 0.02 mm, and the grid height C in the low-velocity region in a range of from 0.01 to 0.025 mm.

[10] The golf ball trajectory method of [8] which sets up, on a bottom side of the virtual airflow space (field), a wall representing a ground surface, thereby making the bottom side of the virtual airflow space (field) a closed side.

[11] The golf ball trajectory method of [10], wherein a ball striking height, defined as the distance from the bottom side of the virtual airflow space (field) representing the ground surface to a bottommost point of the golf ball model, is added to the initial conditions set up in step (E).

[12] The golf ball trajectory simulation method of [8], wherein the grid is shaped as an adaptive Cartesian mesh.

[13] The golf ball trajectory simulation method of [8], wherein the grid is shaped as an unstructured mesh.

[14] The golf ball trajectory simulation method of [8] which calculates, from a velocity, angle and spin rate calculated for the golf ball on landing, the distance traveled by the golf ball after landing until the ball comes to rest, and thereby calculates the distance traveled by the golf ball from launch until coming to rest.

This trajectory simulation method enables the trajectory of a golf ball having a plurality of dimples on the surface thereof, when launched at any initial velocity, any spin rate and any angle, to be estimated without carrying out experimental evaluations using actual physical prototypes, and also enables the ball trajectory under the effect of wind conditions, such as a tailwind, headwind or crosswind, to be estimated.

In such a case, the present invention aims to shorten the computing time while ensuring sufficient accuracy by, as noted above, calculating the Reynolds number (Re) around the golf ball model in flight, dividing the total flight path of the golf ball model into two or three regions based on the criteria that Re=250,000 to 170,000 is a high-velocity region, Re=170,000 to 100,000 is a medium-velocity region and Re=100,000 and below is a low-velocity region, and setting the height of the grid adjacent to the golf ball surface in each of the respective regions (grid heights A to C).

For example, on a shot taken with a driver in which the ball is launched at a high velocity, the aim is to shorten the computing time by dividing the flight path into three regions: an initial high-velocity region where the ball flies at a relatively high velocity (Re=250,000 to 170,000), an intermediate middle-velocity region where the ball flies at a medium velocity (Re=170,000 to 100,000), and a final low-velocity region where the ball flies at a relatively low velocity (Re=100,000 and below), and setting up a grid height in the high-velocity region (grid height A), a grid height in the medium-velocity region (grid height B) and a grid height in the low-velocity region (grid height C) such that grid height A<grid height B<grid height C. That is, in the high-velocity region where the Reynolds number (Re) is large, the boundary layer flowing near the surface of the ball is thin, but as the ball moves into a lower velocity region where the Reynolds number (Re) is smaller, this boundary layer becomes thicker. At the same time, as noted above, the present invention calculates the airstream velocity, direction and pressure in each grid cell generated around the ball model. However, the inventors have discovered that in the above region having a small Reynolds number (Re) where the boundary layer becomes thicker, even when the number of grid cells is decreased by making the grid height around the golf ball model higher and thus making the size of the grid cells relatively large, an accuracy that is acceptable for practical purposes can be ensured. With further investigations, the inventors have also found that by dividing the total flight path, based on the Reynolds number (Re), into three regions—the above-indicated high-velocity region, medium-velocity region and low-velocity region, making the height of the grid adjacent to the golf ball model surface larger in regions having a smaller Reynolds number, and thus decreasing the number of grid cells without sacrificing accuracy, the computing time can be effectively shortened while retaining a good accuracy. These discoveries ultimately led to the present invention. Moreover, when simulating a shot with an iron in which the Reynolds number at the initial stage of the flight path is less than 170,000, the flight path is divided according to the above criteria into two regions: a medium-velocity region (Re=170,000 to 100,000) and a low-velocity region (Re=100,000 and below), and the grid heights in these respective regions are set such that grid height B<grid height C.

The present invention thus enables the total computing time to be shortened by adjusting the number of grid cells generated around the golf ball model in accordance with the flight path and efficiently carrying out computations. As a result, the time it takes to evaluate the surface shape (such as the shape, arrangement and size of the dimples) of a golf ball is shortened while fully ensuring the accuracy and objectivity of the evaluation. This makes it possible to efficiently develop higher performance product for the type and grade of golf ball.

BRIEF DESCRIPTION OF THE DIAGRAMS

The file of this patent contains at least one drawing executed in color. Copies of this patent with color drawings(s) will be provided by the Patent and Trademark Office upon request and payment of the necessary fee.

DETAILED DESCRIPTION OF THE INVENTION

The invention is described more fully below in conjunction with the diagrams.

The golf ball trajectory simulation method of the invention employs arithmetic operations executed by a computer to analyze the trajectory of a golf ball having a plurality of dimples on the surface thereof when the ball is launched into flight.

Figure 1A:
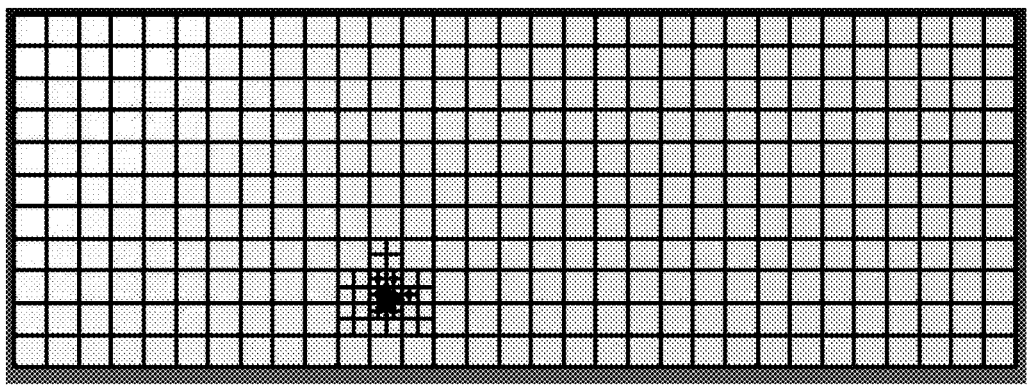
FIG. 1 depicts a golf ball model and a virtual airflow space in the method of the present invention, (A) being a schematic view of a virtual airflow space in its entirety and (B) being an enlarged schematic view showing the vicinity of a golf ball model in (A).

In the golf ball trajectory simulation method of the invention, first, (A) a virtual airflow space (field) where the ball is to be launched is set up by computer and, as shown in FIG. 1A, a grid is generated within the virtual airflow space (field). Although not subject to any particular limitation, the grid formed within the virtual airflow space (field) may be shaped as an adaptive Cartesian mesh or an unstructured mesh.

The virtual airflow space (field) represents the entire region from where the golf ball is launched and travels in flight and at least up until where the ball lands, with the subsequently described golf ball model moving within this virtual airflow space (field). A bottom side of this virtual airflow space (field) may be set as an open side, although it is also possible to set up here a wall representing a ground surface and thus make the bottom side a closed side. In this way, elements representing air leaving the virtual airflow space (field) from the bottom side thereof are excluded from the computations, making it possible to carry out simulations having a higher accuracy.

In addition, when actually playing golf, the ball is also at times placed on a tee and hit. By providing a wall representing this ground surface, the distance from this wall to the bottom-most point of the ball can be set as the striking height in the initial conditions, thereby making it possible to carry out higher-accuracy simulations under conditions closer to those at the time of actual use.

Next, as shown in FIG. 1, (B) a substantially spherical golf ball model having a plurality of dimples formed on a surface thereof is set up within the virtual airflow space (field). This golf ball model, which may be created by 3D CAD, for example, is exemplified by the golf ball model shown in FIG. 2.

When the golf ball model is set up within the virtual airflow space (field), (C) the grid is divided into cells in such a way as to make the grid near the golf ball model finer than the grid within the virtual space (field) and to have the grid gradually increase in size in a direction leading away from the surface of the ball model. By dividing the grid near the golf ball model into cells in this way, excess computations can be avoided, enabling computation to be carried out more efficiently.

Figure 1B:
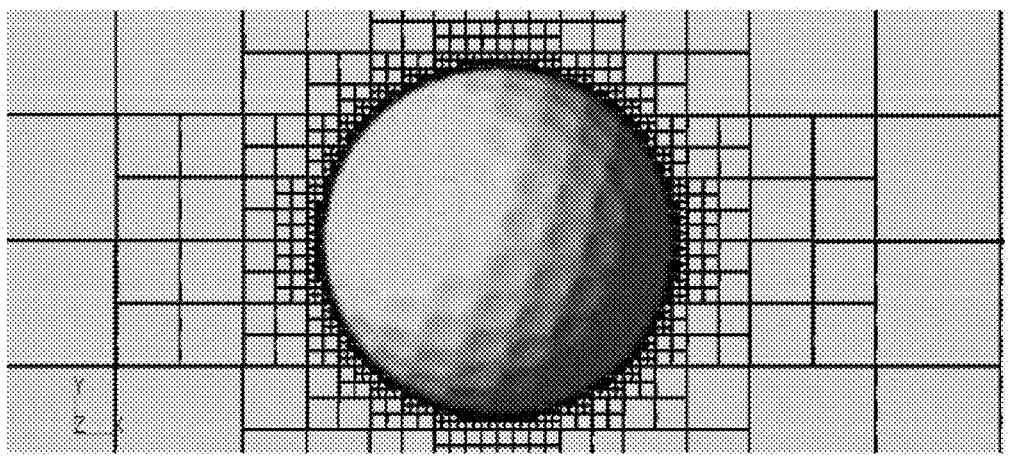
Figure 2A:
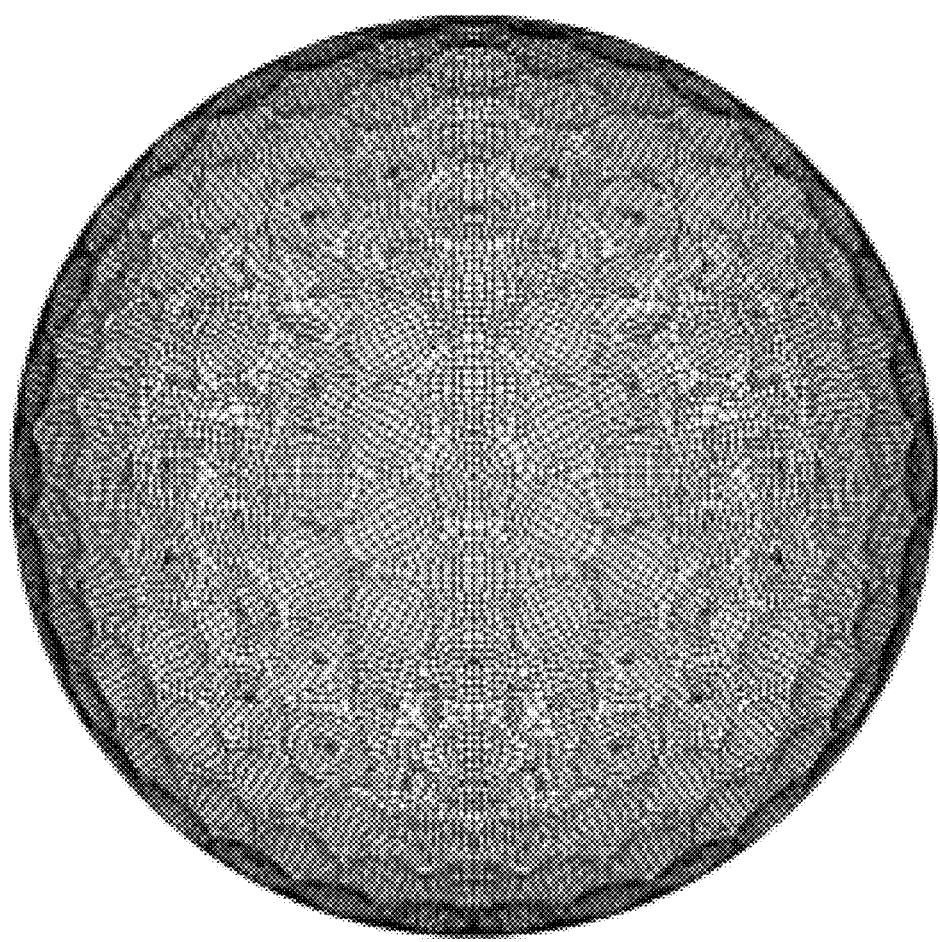
FIG. 2 shows an example of a golf ball model in the present invention, (A) being a view showing face cells formed on the surface and (B) being a view showing dimples formed on the surface.

Specifically, first, as shown in FIG. 2A, the surface of the golf ball model is divided into cells measuring, for example, about 0.002 mm on a side, thereby setting up a large number of polygonal (e.g., triangular, quadrangular) or substantially polygonal (e.g., substantially triangular, substantially quadrangular) face cells, and setting up grid cells adjacent to the golf ball model surface that is entirely covered by these individual face cells. The grid cells adjacent to the golf ball model surface are set in a substantially polygonal prismatic shape such as a substantially quadrangular prismatic shape, or in a substantially polygonal pyramidal shape. Also, as shown in FIG. 1B, from the grid cells adjacent to the golf ball model surface, the remainder of the virtual airflow space (field) is divided grid-like into cells in such a way that the volume of the grid cells gradually increases in directions leading away from the golf ball. In this way, the entire virtual airflow space is divided into grid cells.

The grid cells formed in the remainder of the virtual airflow space (field) other than the grid cells adjacent to the surface of the golf ball model have shapes exemplified by polyhedrons such as hexahedrons, triangular prismatic pentahedrons, quadrangular pyramidal pentahedrons and triangular pyramidal tetrahedrons. These shapes may be suitably combined in setting up the grid cells.

Because the air streams around a golf ball have a larger influence when close to the golf ball, as shown in FIG. 1B and explained above, the grid cells are set up in such a way as to be finer near the golf ball model and coarser away from the golf ball model where the influence exerted by the air stream is small. The increase in the volume of the grid cells in directions leading away from the ball surface of the golf ball model may be continuous or stepwise.

Here, in this invention, the Reynolds number (Re) around the golf ball model in flight is calculated, the flight path is divided into three regions based on the Reynolds number, and the height of the grid adjacent to the surface of the golf ball model is set for each of the respective regions. The division of the flight path into regions and the setting of grid heights are described later in the specification.

Next, (D) a weight is set for the golf ball model and (E) initial conditions (initial velocity, launch angle, spin rate) are applied to the golf ball model, causing the model to move in the virtual airflow space (field).

Here, as mentioned above, in cases where a wall representing the ground surface is set up on the bottom side of the virtual airflow space (field), thereby making the bottom side of the virtual airflow space (field) a closed side, the distance from this bottom side to the bottommost point of the golf ball may be added as the ball striking height to the initial conditions. In this way, simulations of cases in which a ball is placed on a tee and hit can be carried out to a higher accuracy.

In this manner, (F) movement of the golf ball model having the weight (D) is begun under the initial conditions (E) within the virtual airflow space (field), the grid near the ball is regenerated in the area of movement in such a way as to follow the movement of the ball model without disturbing the originally set grid size, and the grid after the ball has passed therethrough is restored to the grid within the virtual airflow space (field).

Then, when the golf ball model flies within the virtual airflow space (field) while spinning at a given rate, an analysis of the elements of motion within the virtual airflow space (field) of the air streams generated by forces which arise from the airflow coming into contact with the spinning golf ball model and which act on the surface of the golf ball model is carried out for each grid cell.

The elements of motion that arise when an air stream generated by the flight of the golf ball model comes into contact with the golf ball model are the velocity of the air stream in each axial direction in a three-dimensional spatial coordinate system, the direction of the air stream, and the pressure of the air stream against the surface of the ball model. These elements of motion can be calculated by substituting numerical values into the basic equations used for computation; that is, the equations of continuity (1) to (3) below corresponding to the law of conservation of mass, and the Navier-Stokes equations (4) to (6) below corresponding to the law of conservation of momentum by a physical body.

$$\frac{\partial \rho}{\partial t} + \frac{\partial (\rho u)}{\partial x} + \frac{\partial (\rho v)}{\partial y} + \frac{\partial (\rho w)}{\partial z} = 0 \quad (1)$$

$$div V = \frac{\partial (\rho u)}{\partial x} + \frac{\partial (\rho v)}{\partial y} + \frac{\partial (\rho w)}{\partial z} \quad (2)$$

where u, v and w are the velocities in the x, y and z directions, respectively.
Using the divergence operator, $$\frac{\partial \rho}{\partial t} + div(\rho V) = 0. \quad (3)$$

Letting the mass force be F, $$\frac{Du}{Dt} = Fx - \frac{1}{\rho}\frac{\partial p}{\partial x} + \frac{\mu}{\rho}\left(\frac{\partial^2 u}{\partial x^2} + \frac{\partial^2 u}{\partial y^2} + \frac{\partial^2 u}{\partial z^2}\right) + \frac{1}{3}\frac{\mu}{\rho}\frac{\partial}{\partial x}\left(\frac{\partial u}{\partial x} + \frac{\partial v}{\partial y} + \frac{\partial w}{\partial z}\right) \quad (4)$$

$$\frac{Dv}{Dt} = Fy - \frac{1}{\rho}\frac{\partial p}{\partial y} + \frac{\mu}{\rho}\left(\frac{\partial^2 v}{\partial x^2} + \frac{\partial^2 v}{\partial y^2} + \frac{\partial^2 v}{\partial z^2}\right) + \frac{1}{3}\frac{\mu}{\rho}\frac{\partial}{\partial y}\left(\frac{\partial u}{\partial x} + \frac{\partial v}{\partial y} + \frac{\partial w}{\partial z}\right) \quad (5)$$

$$\frac{Dw}{Dt} = \quad (6)$$
$$Fz - \frac{1}{\rho}\frac{\partial p}{\partial z} + \frac{\mu}{\rho}\left(\frac{\partial^2 w}{\partial x^2} + \frac{\partial^2 w}{\partial y^2} + \frac{\partial^2 w}{\partial z^2}\right) + \frac{1}{3}\frac{\mu}{\rho}\frac{\partial}{\partial z}\left(\frac{\partial u}{\partial x} + \frac{\partial v}{\partial y} + \frac{\partial w}{\partial z}\right)$$

where $\rho$ is the air density, p is the air pressure, and $\mu$ is the air viscosity.

In the above simulation, the flow of air may be analyzed for each of the grid cells in the virtual airflow space by arithmetic operations. Using the above equations (1) to (6) for the arithmetic operations, equations (1) to (6) can be discretized according to the division of the virtual airflow space into grid cells, and the operations carried out. The method of simulation to may be suitably selected from among, e.g., finite difference calculus, finite volume methods, boundary element methods and finite element methods, and carried out while taking parameters such as the simulation conditions into account.

Here, in some cases, simulation according to the wind conditions may be carried out by (D-2) setting up within the virtual airflow space a state wherein an air stream of a given velocity flows into the golf ball model.

That is, by creating in the virtual airflow space a stream of air which is oriented laterally, in the direction of travel, or against the direction of travel by the ball, simulation which takes into account conditions in which there is a tailwind, a headwind or a crosswind can also be carried out. Specifically, when taking into account a headwind, for example, a state is established where an air stream of a given velocity flows into the virtual airflow space from in front of the golf ball model, and the golf ball model is made to move in a state where the air stream has been set up in each cell of the entire virtual airflow space. In cases where wind conditions other than a headwind are to be taken into account, simulation may be carried out by changing the direction of the incoming stream of air.

Next, (G) a lift coefficient and a drag coefficient for the golf ball in flight within the virtual airflow space (field) are calculated by integrating the air stream velocity, direction and pressure calculated in each grid cell within the virtual airflow space (field).

Here, using a scattering model for the air stream, the lift coefficient CL and the drag coefficient CD can be calculated by substituting velocity values that take into account the degree of turbulence.

The ball model is then made to move under the above lift coefficient and drag coefficient, the ball weight set in step (D) and the initial conditions (initial velocity, launch angle, spin rate, ball striking height) in step (E), and the trajectory is estimated by (H) calculating a flight distance and a left-to-right dispersion for the golf ball from launch until landing by calculating a change in height, a change in lateral direction, a change in velocity and a change in spin rate for the golf ball during flight.

Figure 4:
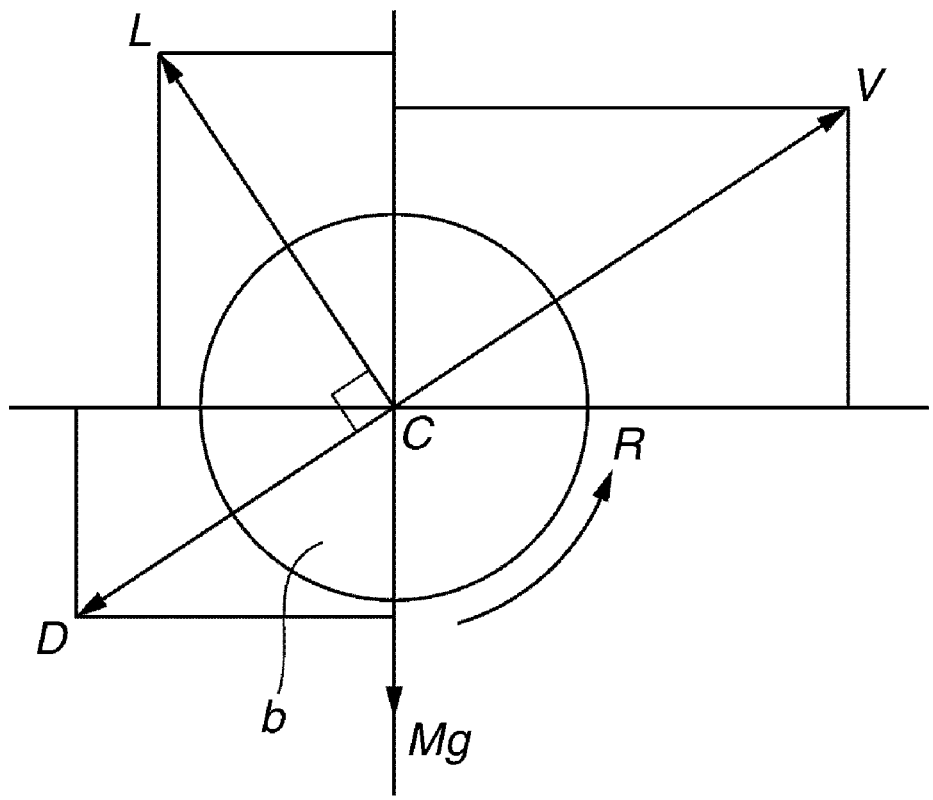
FIG. 4 is a diagram showing the forces which act on a golf ball that spins while in flight.

It is known that a golf ball hit with a club and launched into flight incurs, as shown in FIG. 4, gravity Mg, air resistance (drag) D, and also lift L due to the Magnus effect because the ball has spin. FIG. 4 also shows the direction of flight V and the ball center c. In the illustrated case, the golf ball b is spinning in the direction of the arrow R.

The forces acting upon the golf ball in this case are represented by the following trajectory equation (7).

$$F = FL + FD + Mg \quad (7)$$

where F: forces acting upon golf ball
FL: lift
FD: drag
Mg: gravity

Movement by the golf ball can be determined from the following equations of motion.

$$F_{cd} = 0.5 \times CD \times \rho \times A \times V^2 \quad (8)$$

$$F_{cl} = 0.5 \times CL \times \rho \times A \times V^2 \quad (9)$$

$$F_{cd} + F_{cl} + mg = m \times dV/dt \quad (10)$$

where m: ball weight
g: gravitational acceleration
t: time
CL: coefficient of lift
CD: coefficient of drag
ρ: air density
A: cross-sectional surface area of golf ball
V: velocity of golf ball with respect to air From this, the velocity of the golf ball after it has flown for a short period of time is calculated. In addition, by applying the result to Newton's equation of motion relating to parabolic motion, the distance traveled by the ball and its change in height after the ball has flown for a short period of time can be calculated. The Euler method or the Runge-Kutta method may be used to solve the above differential equations, thereby enabling the velocity for a short time interval to be calculated.

Also, although the spin rate (rotational speed) of the flying golf ball gradually diminishes with the passage of time, the spin rate after a short time has elapsed can be calculated from the following formulas.

$$\omega = \omega_0 \times E_{xp}\{-(SRD_1 + SRD_2 \times V) \times t \times \beta\} \quad (11)$$

$$\beta = (\pi \times \rho \times r^4)/l \quad (12)$$

$\omega_0$: where initial angular speed of rotation by golf ball
$\omega$: angular speed of rotation by golf ball
V: velocity of golf ball with respect to air
t: time
ρ: air density
r: radius of golf ball
l: inertial moment of golf ball
$SRD_1$, $SRD_2$: empirically determined attenuation coefficients specific to dimples As a result, the flight distance and change in height of the ball after flying for a short period of time are calculated, these operations serving as a first step. The foregoing operations are then repeated using the calculated spin rate and velocity as the above-described spin rate and velocity after a short period of time has elapsed. By successively calculating the flight distance and height of the ball with the passage of each individual short time interval from the time that the ball is launched until the time it lands, the trajectory of the ball can be estimated.

From the standpoint of the efficiency and accuracy of simulation, it is preferable to set the very short time intervals to from 0.001 to 0.5 second.

In the present invention, when the ball distance and height as each small period of time elapses are calculated by means of the above operations, the height of the grid adjacent to the golf ball model surface is set for each of the regions divided according to the Reynolds number (Re) around the golf ball model: a high-velocity region, a medium-velocity region and a low-velocity region.

First, the Reynolds number (Re) around the golf ball model in flight is calculated and the total flight path is divided into two or three regions based on the criteria that the flight path at a Reynolds number (Re) of from 250,000 to 170,000 is a high-velocity region, the flight path at a Reynolds number of from 170,000 to 100,000 is a medium-velocity region, and the flight path at a Reynolds number of 1000,000 and below is a low-velocity region. In other words, the Reynolds number (Re) around the golf ball model during flight is calculated, and the flight path from the time of launch until the Reynolds number (Re) falls below 170,000 is treated as a high-velocity region, the flight path from Re=170,000 to Re=100,000 is treated as a medium-velocity region, and the flight path from when Re falls to 100,000 and below until the golf ball lands is treated as a low-velocity region. In this case, Re=170,000, which is the boundary between the above high-velocity region and the medium-velocity region, may be treated as falling within either the high-velocity region or the medium-velocity region. However, when priority is given to shortening the computing time, it is preferable to place this in the medium-velocity region; on the other hand, when priority is given to accuracy, it is preferable to place this in the high-velocity region. Similarly, Re=100,000, which is the boundary between the medium-velocity region and the low-velocity region, may be treated as falling within either the medium-velocity region or the low-velocity region, although when priority is given to shortening the computing time, it is preferable to place this in the low-velocity region, and when priority is given to accuracy, it is preferable to place this in the medium-velocity region. Moreover, when simulating a shot with an iron at which the Reynolds number immediately after launch is less than 170,000, the total flight path is divided, based on the above criteria, into two regions: a medium-velocity region and a low-velocity region.

Calculations of the Reynolds number are carried out according to formula (13) below.

$$Re = UL/v \quad (13)$$

where Re: Reynolds number
U: characteristic velocity (velocity of golf ball with respect to air, m/s)
L: characteristic length (diameter of golf ball, m)
V: kinetic viscosity, $m^2/s$ Next, in the invention, the height of the grid adjacent to the golf ball model surface in the high-velocity region (grid height A), the height of the grid adjacent to the golf ball model surface in the medium-velocity region (grid height B) and the height of the grid adjacent to the golf ball model surface in the low-velocity region (grid height C), all defined as described above in terms of the Reynolds number, are set up such that grid height A<grid height B<grid height C. Of course, even in cases where the Reynolds number immediately after launch does not reach Re=170,000 and the flight path is divided into two regions a medium-velocity region and a low-velocity region, the grid heights for these respective regions are likewise set up such that grid height B<grid height C. In this way, even when a relatively large grid is used around the golf ball model, thus making the number of grid cells smaller, by employing a smaller number of grid cells in those regions where an accuracy that is acceptable for practical purposes can be ensured, the number of computations is reduced within a range that does not sacrifice accuracy, thus making it possible to shorten the computing time.

Here, the respective grid heights A, B and C, although not subject to any particular limitation, may be suitably set in such a way as to obtain, for the properties such as initial velocity, launch angle and initial spin rate of the golf ball model under consideration, a sufficiently useful accuracy and an excellent reduction in the computing time. The grid height A in the high-velocity region is preferably set in a range of from 0.001 to 0.15 mm, the grid height B in the medium-velocity region is preferably set in a range of from 0.005 to 0.02 mm, and the grid height C in the low-velocity region is preferably set in a range of from 0.01 to 0.025 mm. Here, at grid heights which exceed the upper limits in the above ranges, sufficient accuracy may not achieved, as a result of which it may not be possible to carry out good evaluations. On the other hand, below the lower limits in these grid heights, it may not be possible to sufficiently shorten the computing time.

An example of a specific sequence for carrying out the trajectory simulation of the invention is described below. First, as shown in FIG. 1A, a virtual airflow space where the ball will be launched is set up in a computer, and a grid is generated within this virtual airflow space (field). In this case, if necessary, a wall representing a ground surface is set up on a bottom side of the virtual airflow space. Also, for the golf ball model shown in FIG. 2, for example, the ball weight, diameter and moment of inertia are set. In addition, the initial velocity, launch angle and initial spin rate are set as the initial conditions at launch. If necessary, a ball striking height is set as well. This golf ball model is set within a virtual airflow space (field) where a grid has been generated as shown in FIG. 1A. In addition, the fine grid shown in FIG. 1B is generated near the golf ball model and is divided into cells in such a way that the size of the cells gradually increases in directions leading away from the ball model. In this case, the height of the grid adjacent to the golf ball model surface is set to the grid height A that has been set for the subsequently described high-velocity region. The ball model is then caused to move within the virtual airflow space (field) under the above initial conditions and the lift coefficient CL and drag coefficient CD are calculated, following which the velocity of the golf ball after flying for a predetermined short time interval is calculated using above formulas (8), (9) and (10). The flight distance and height of the ball after flying for the above short time interval are then calculated from these results using Newton's equation of motion relating to parabolic motion. In addition, the spin rate of the ball after a given length of time t has elapsed is computed using formulas (11) and (12). At the same time, the Reynolds number (Re) around the ball model is calculated using above formula (13).

Figure 3:
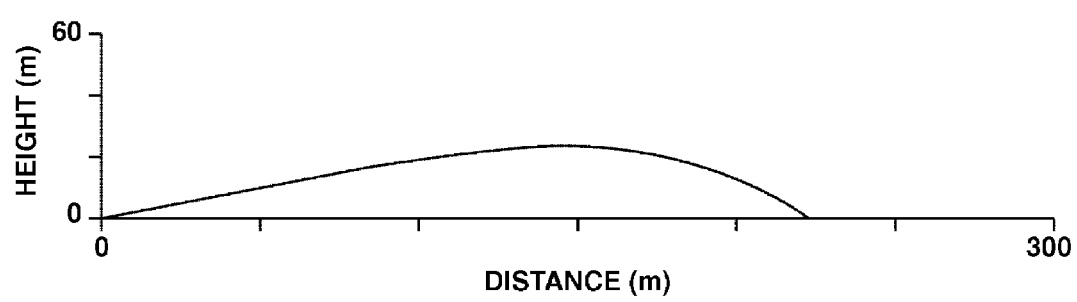
FIG. 3 is a diagram showing an example of a golf ball trajectory estimated by the trajectory simulation method of the present invention.

Next, the velocity and spin rate of the golf ball after flying for a short time interval that have been thus calculated are used to similarly calculate by the above-described method the flight distance, left-to-right dispersion, height and spin rate of the ball after additionally flying for a short time interval, and this operation is repeated. Next, at the point in the flight where the Reynolds number (Re) falls to 170,000, the ball is judged to have reached the medium-velocity region and the height of the grid adjacent to the golf ball model surface is increased to a predetermined grid height that has been set for the medium-velocity region (grid height B). The above computations are additionally repeated using this grid height B and, at the point in the flight where the Reynolds number (Re) falls to 100,000, the ball is judged to have reached the low-velocity region and the height of the grid adjacent to the golf ball model surface is increased to a predetermined grid height that has been set for the low-velocity region (grid height C). The above calculations are then similarly repeated using this grid height C up until the position at which the golf ball lands, thereby enabling the golf ball trajectory shown in FIG. 3 to be obtained. Moreover, as explained above, in cases where the initial Reynolds number (Re) is less than 170,000, the flight path is divided into two regions a medium-velocity region and a low-velocity region, and computations are similarly carried out to give the golf ball trajectory.

If necessary, the distance traveled by the golf ball until it comes to rest after landing (the "run," or "rolling distance") may be calculated from the calculated velocity, angle and spin rate of the golf ball at the time that it lands, enabling the distance traveled by the ball from where it is launched up to where it comes to rest to be calculated.

The run (rolling distance) can be calculated from the following formula (14).

$$\text{Run(rolling distance)} = A \times \text{Land } X \text{ velocity} - B \times \text{Land } Y \text{ velocity} + C \times \text{Land Angle} - D \times \text{Land Spin} \tag{14}$$

Here, Land X velocity: Horizontal landing velocity component (m/s)

Land Y velocity: Sin 2θ×vertical landing velocity component (m/s)

Land Angle: Cos θ

Land Spin: Spin rate on landing

A, B, C, D: Specific coefficients obtained by back calculations from actual golf ball tests. By varying these coefficients, differences in the ground conditions (e.g., grass and concrete) can be reflected in the simulation.

The trajectory simulation method of the invention enables the trajectory of a golf ball, when the ball is launched at any initial velocity, any spin rate and any angle, to be estimated without carrying out experimental evaluations using actual physical prototypes, such as wind tunnel tests. The inventive method also enables the ball trajectory under the effect of wind conditions, such as a tailwind, headwind or crosswind, to be estimated. Moreover, the invention, by dividing the total flight path of the ball into two or three regions based on the Reynolds number (Re) and setting for each region a height for the grid adjacent to the golf ball model surface so as to adjust the size and number of the grid cells, is able to shorten the computing time while ensuring a sufficient accuracy.

EXAMPLES

Examples of the invention and Comparative Examples are given below by way of illustration, and not by way of limitation.

Examples and Comparative Examples

Figure 2B:
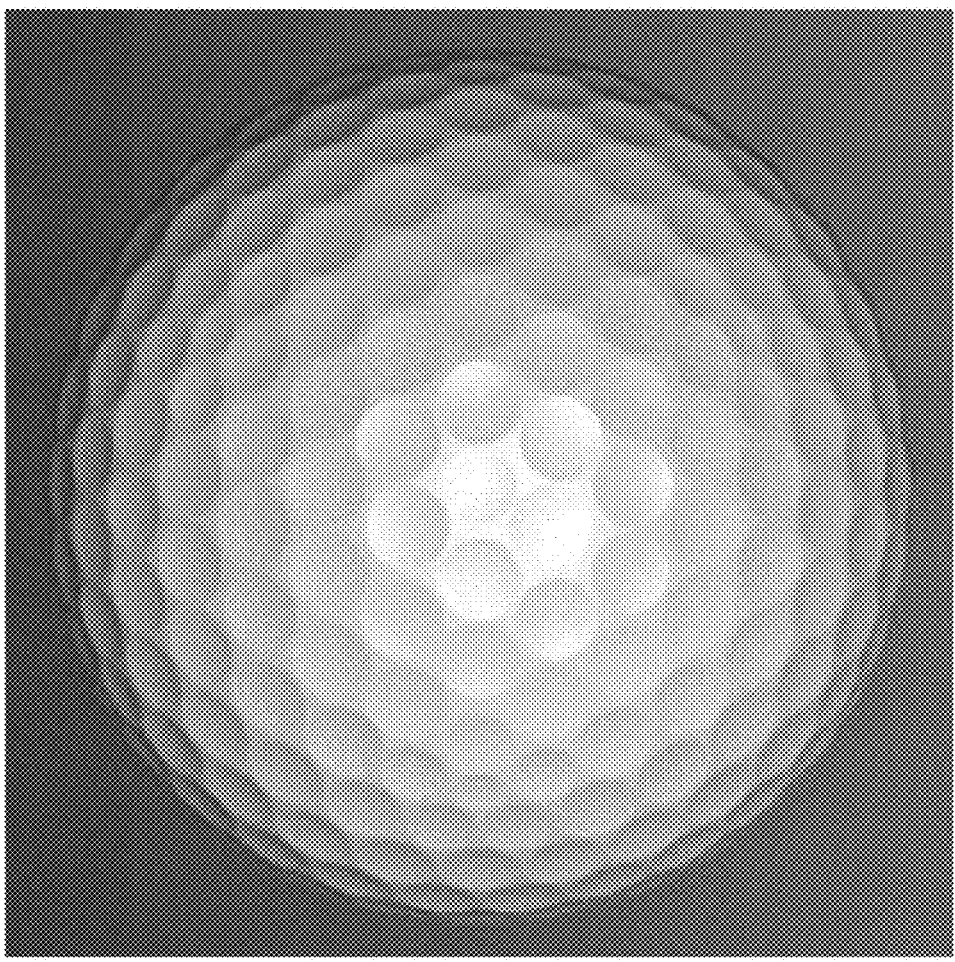

Using the golf ball model shown in FIG. 2, the ball weight was set to of 45.3 g, the diameter to 42.7 mm and the moment of inertia to $7.8 \times 10^{-6}$ kg·m$^2$. The initial conditions at launch were set to an initial velocity of 65 m/s, a launch angle of 10.5°, an initial spin rate of 2,800 rpm and a ball striking height of 50 mm. This golf ball model was set within a virtual airflow space (field) where a grid was generated as shown in FIG. 1A. In addition, the fine grid shown in FIG. 1B was generated near the golf ball model, and the grid was divided into cells in such a way as to have the grid gradually increase in size in directions leading away from the ball model. The ball model was then caused to move within the virtual airflow space (field) under the above initial conditions, and the lift coefficient CL and drag coefficient CD were calculated, following which the velocity of the golf ball after flying for a predetermined short time interval (0.001 second) was calculated using above formulas (8), (9) and (10). The flight distance and height of the ball after flying for the above short time interval (0.001 second were then calculated from these results using Newton's equation of motion relating to parabolic motion. In addition, the spin rate of the ball after the above short time interval (0.001 second) had elapsed was calculated using formulas (11) and (12).

Next, the velocity and spin rate of the golf ball after flying for a short time interval (0.001 second) that had been thus calculated were used to similarly calculate by the above-described method the flight distance, left-to-right dispersion, height and spin rate of the ball after additionally flying for a short time interval (0.001 second). These operations were subsequently repeated in the same way up to the position where the golf ball lands, thereby simulating the golf ball trajectory and estimating the carry of the ball.

At this time, in Examples 1 and 2 of the invention, the Reynolds number (Re) around the golf ball in flight was calculated using above formula (13), the total flight path was divided into three regions: a high-velocity region where Re=250,000 to 170,000, a medium-velocity region where Re=170,000 to 100,000 and a low-velocity region where Re=100,000 and below, the heights of the grid adjacent to the surface of the golf ball model in the respective regions were set as shown in Table 1, and the above-described simulation was carried out. By contrast, in the comparative example, the division into regions was not carried out; instead the grid height was set to 0.001 mm for the entire flight path, and simulation was carried out. The estimated carry and the time required for simulation (computing time) are shown in Table 1. The computing time-shortening effect was rated according to the following criteria. Details concerning the computer used for the simulation are shown below. The grid cells adjacent to the surface of the ball model were in the form of a Cartesian grid (tetragonal). The dimensions of the individual cells were set to: the height shown in Table 1×a width of 0.5 mm×a depth of 0.5 mm.

Computing Time Rating Criteria
    Excellent: 150 hours or less
    Good: 250 hours or less
    NG: more than 250 hours
(The rating criteria were set in this way for the simulations carried out here using the computer shown below. The criteria for rating the computing time must be suitably modified according to the computer performance.)

Details of Computer
OS: Windows XP
CPU: Intel Xeon X5482, 3.20 GHz/L2=6 MB×2,
FSB=1600 MHz, 2 CPU/8 Core
Memory: 64 GB (4096 MB×16), DDR2-800, ECC, REG, FB-DIMM Hitting tests were carried out by the method described below for the golf ball model set up in the above simulation and for a similar actual golf ball. The actual measured value obtained (213.2 yards) was compared with the results from the above simulation, and the accuracy of the simulation was rated according to the criteria shown below. The results are shown in Table 1.

Hitting Test
    The carry of a golf ball when actually struck with a driver (W#1; TourStage X-Drive 701, manufactured by Bridgestone Sports Co., Ltd.; loft, 9°) mounted on a swing robot was measured, thereby giving a measured value. The striking conditions at this time were set to a ball initial velocity of 65 m/s, a launch angle of 10.5°, and an initial backspin rate of 2,800 rpm. The ball was placed on a tee and hit, and the height from the ground to the bottommost part of the ball was set to 50 mm. The results obtained were a carry of 213.2 yards and a total distance (carry+run) of 227.5 yards.

Accuracy Rating Criteria
    Excellent: within ±5 yards of measured value
    Good: within ±10 yards of measured value
    NG: more than ±10 yards of measured value

TABLE 1

| Region | Example 1 | | | Example 2 | | | Comparative Example |
| --- | --- | --- | --- | --- | --- | --- | --- |
| | high-velocity region | medium-velocity region | low-velocity region | high-velocity region | medium-velocity region | low-velocity region | no division of regions |
| Grid height | 0.015 mm | 0.02 mm | 0.025 mm | 0.001 mm | 0.005 mm | 0.01 mm | 0.001 mm |
| Computing time | 55 H | 50 H | 45 H | 100 H | 80 H | 65 H | 300 H |
| Total computing time | | 150 H | | | 245 H | | 300 H |
| Computing time rating | | Excellent | | | Good | | NG |
| Carry | | 207.6 yd | | | 214.2 yd | | 213.1 yd |
| Carry accuracy rating | | Good | | | Excellent | | Excellent |

As shown in Table 1, by dividing the total flight path into three regions based on given Reynolds numbers (Re) and setting a height for the grid adjacent to the surface of the golf model in the high-velocity region at Re=250,000 to 170,000 (grid height A), a height for the grid adjacent to the surface of the golf model in the medium-velocity region at Re=170,000 to 100,000 (grid height B), and a height for the grid adjacent to the surface of the golf model in the low-velocity region at Re=100,000 and below (grid height C) such that grid height A<grid height B<grid height C, it was possible to effectively shorten the computing time while maintaining a sufficient accuracy.

The invention claimed is:

1. A golf ball trajectory simulation method which employs arithmetic operations executed by a computer to analyze and estimate the trajectory of a golf ball having a plurality of dimples on a surface thereof when the ball is launched into flight, comprising:
    (A) generating a grid within a virtual airflow space where the ball is to be launched;
    (B) setting up within the virtual airflow space a spherical golf ball model having a plurality of dimples formed on a surface thereof;
    (C) dividing the grid into cells in such a way as to make the grid near the golf ball model finer than the grid within the virtual space and to have the grid gradually increase in size in a direction leading away from the surface of the ball model;
    (D) setting a weight for the golf ball model;
    (E) applying initial conditions including initial velocity, launch angle, spin rate, to the golf ball model;
    (F) initiating movement of the golf ball model under the initial conditions, regenerating in an area of movement the grid near the ball in such a way as to follow the movement of the ball model without disturbing an originally set grid size, and restoring the grid after the ball has passed therethrough to the grid within the virtual airflow space;
    (G) calculating a lift coefficient and a drag coefficient for the golf ball in flight within the virtual airflow space by integrating an air stream velocity, direction and pressure calculated in each grid cell within the virtual airflow space; and (H) calculating a flight distance and a left-to-right dispersion for the golf ball from launch until landing by calculating a change in height, a change in lateral direction, a change in velocity and a change in spin rate for the golf ball during flight, wherein the simulation method, when estimating the trajectory, calculates the Reynolds number (Re) around the golf ball model in flight, divides a flight path of the golf ball model into two or three regions based on the criteria that: (1) Re=250,000 to more than 170,000 is a high-velocity region, Re=170,000 or less to more than 100,000 is a medium-velocity region and Re=100,000 and below is a low-velocity region; or (2) Re=250,000 or less to not less than 170,000 is a high velocity region, Re=less than 170,000 to not less than 100,000 is a medium-velocity region and Re=less than 100,000 is a low-velocity region, and sets up a height for the grid adjacent to the golf ball model surface in the high-velocity region at grid height A, a height for the grid adjacent to the golf ball model surface in the medium-velocity region at grid height B and a height for the grid adjacent to the golf ball model surface in the low-velocity region at grid height C such that grid height A<grid height B<grid height C.

2. The golf ball trajectory simulation method of claim 1 which sets the grid height A in the high-velocity region in a range of from 0.001 to 0.015 mm, the grid height B in the medium-velocity region in a range of from 0.005 to 0.02 mm, and the grid height C in the low-velocity region in a range of from 0.01 to 0.025 mm.

3. The golf ball trajectory method of claim 1 which sets up, on a bottom side of the virtual airflow space, a wall representing a ground surface, thereby making the bottom side of the virtual airflow space a closed side.

4. The golf ball trajectory method of claim 3, wherein a ball striking height, defined as the distance from the bottom side of the virtual airflow space representing the ground surface to a bottommost point of the golf ball model, is added to the initial conditions set up in step (E).

5. The golf ball trajectory simulation method of claim 1, wherein the grid is shaped as an adaptive Cartesian mesh.

6. The golf ball trajectory simulation method of claim 1, wherein the grid is shaped as an unstructured mesh.

7. The golf ball trajectory simulation method of claim 1 which calculates, from a velocity, angle and spin rate calculated for the golf ball on landing, the distance traveled by the golf ball after landing until the ball comes to rest, and thereby calculates the distance traveled by the golf ball from launch until coming to rest.

8. A golf ball trajectory simulation method that employs arithmetic operations executed by a computer to analyze and estimate a trajectory of a golf ball having a plurality of dimples on a surface thereof when the ball is launched into flight, comprising:

(A) generating a grid within a virtual airflow space where the ball is to be launched;

(B) setting up within the virtual airflow space a spherical golf ball model having a plurality of dimples formed on a surface thereof;

(C) dividing the grid into cells in such a way as to make the grid near the golf ball model finer than the grid within the virtual space and to have the grid gradually increase in size in a direction leading away from the surface of the ball model;

(D-1) setting a weight for the golf ball model;

(D-2) setting up within the virtual airflow space a state wherein an air stream of a given velocity flows into the golf ball model;

(E) applying initial conditions including initial velocity, launch angle, spin rate, to the golf ball model;

(F) initiating movement of the golf ball model under the initial conditions, regenerating in an area of movement the grid near the ball in such a way as to follow the movement of the ball model without disturbing an originally set grid size, and restoring the grid after the ball has passed therethrough to the grid within the virtual airflow space;

(G) calculating a lift coefficient and a drag coefficient for the golf ball in flight within the virtual airflow space by integrating an air stream velocity, direction and pressure calculated in each grid cell within the virtual airflow space; and (H) calculating a flight distance and a left-to-right dispersion for the golf ball from launch until landing by calculating a change in height, a change in lateral direction, a change in velocity and a change in spin rate for the golf ball during flight, wherein the simulation method, when estimating the trajectory, calculates the Reynolds number (Re) around the golf ball model in flight, divides a flight path of the golf ball model into two or three regions based on the criteria that: (1) Re=250,000 or less to more than 170,000 is a high-velocity region, Re=170,000 or less to more than 100,000 is a medium-velocity region and Re=100,000 and below is a low-velocity region; or (2) Re=250,000 or less to not less than 170,000 is a high velocity region, Re=less than 170,000 to not less than 100,000 is a medium-velocity region and Re=less than 100,000 is a low-velocity region, and sets up a height for the grid adjacent to the golf ball model surface in the high-velocity region at grid height A, a height for the grid adjacent to the golf ball model surface in the medium-velocity region at grid height B and a height for the grid adjacent to the golf ball model surface in the low-velocity region at grid height C such that grid height A<grid height B<grid height C.

9. The golf ball trajectory simulation method of claim 8 which sets the grid height A in the high-velocity region in a range of from 0.001 to 0.015 mm, the grid height B in the medium-velocity region in a range of from 0.005 to 0.02 mm, and the grid height C in the low-velocity region in a range of from 0.01 to 0.025 mm.

10. The golf ball trajectory method of claim 8 which sets up, on a bottom side of the virtual airflow space, a wall representing a ground surface, thereby making the bottom side of the virtual airflow space a closed side.

11. The golf ball trajectory method of claim 10, wherein a ball striking height, defined as the distance from the bottom side of the virtual airflow space representing the ground surface to a bottommost point of the golf ball model, is added to the initial conditions set up in step (E).

12. The golf ball trajectory simulation method of claim 8, wherein the grid is shaped as an adaptive Cartesian mesh.

13. The golf ball trajectory simulation method of claim 8, wherein the grid is shaped as an unstructured mesh.

14. The golf ball trajectory simulation method of claim 8 which calculates, from a velocity, angle and spin rate calculated for the golf ball on landing, the distance traveled by the golf ball after landing until the ball comes to rest, and thereby calculates the distance traveled by the golf ball from launch until coming to rest.

* * * * *